United States Patent [19]

Brandt et al.

[11] Patent Number: 4,721,036

[45] Date of Patent: Jan. 26, 1988

[54] APPARATUS FOR MIXING KETTLE CONTENTS

[75] Inventors: John M. Brandt; Gerry C. Zekert, both of Suffolk, Va.

[73] Assignee: Nabisco Brands, Inc., Parsippany, N.J.

[21] Appl. No.: 916,312

[22] Filed: Oct. 7, 1986

[51] Int. Cl.$^4$ .................... A47J 27/00; B01F 9/02
[52] U.S. Cl. ................................. 99/348; 366/231; 366/232
[58] Field of Search ............... 99/348; 366/220, 221, 366/222, 225, 230, 231, 232, 309

[56] References Cited

U.S. PATENT DOCUMENTS

| | | |
|---|---|---|
| 770,859 | 9/1904 | Hudson et al. . |
| 833,498 | 10/1906 | Appleton . |
| 1,027,172 | 5/1912 | Bigelow . |
| 1,752,833 | 4/1930 | Brumder ........................... 366/222 |
| 1,817,833 | 8/1931 | O'Connell et al. . |
| 1,918,679 | 7/1933 | Witherspoon . |
| 1,993,528 | 3/1935 | Roser . |
| 2,518,310 | 8/1950 | Harstick . |
| 2,650,806 | 9/1953 | Hooper . |
| 4,078,263 | 3/1978 | Campbell . |
| 4,357,109 | 11/1982 | Blakeway ........................... 366/63 |
| 4,491,415 | 1/1985 | Bishop . |
| 4,525,072 | 6/1985 | Giusti ................................. 99/348 |

Primary Examiner—Robert W. Jenkins
Attorney, Agent, or Firm—Richard Kornutik

[57] ABSTRACT

A processing apparatus for comestibles such as nuts and syrup comprising a kettle having an opening at one end thereof for access for insertion and removal of the comestibles. The kettle has a generally concave shape and is rotatable about an axis with respect to a supporting base. The kettle has a generally concave surface symmetric with respect the rotation axis. A mixing device is provided and is mounted stationary with respect to the rotating kettle and comprises an elongate substantially rigid bar which has a concave shape and is spaced from the rotating concave surface of the kettle. The bar contacts the comestibles during rotation of the kettle and continuously turns the comestibles to provide substantially uniform mixing thereof.

19 Claims, 6 Drawing Figures

APPARATUS FOR MIXING KETTLE CONTENTS

BACKGROUND OF THE INVENTION

The present invention relates to a processing apparatus for comestibles, and more specifically an apparatus for mixing the contents of a kettle. The apparatus of the present invention has particular application to the roasting of nuts coated with a coating comprising sugar in a kettle.

DESCRIPTION OF THE PRIOR ART

In the production of nut snack foods, it is often desirable to roast raw nuts in a cooking kettle and simultaneously coat the raw nuts with a syrup comprising sugar and butter. The nuts are heated in a kettle which has a generally concave shape and rotatable about an axis. The kettle, preferably made of copper or a copper alloy, is heated by a gas burner. The coated nuts in the kettle are stirred and mixed manually with a paddle until the water evaporates and the coating is caramelized.

In order to produce large quantities of coated nuts, many ketles are operated simultaneously, each providing a batch of coated nuts. Thus, the multiple kettles require continuous stirring and intensive labor to be sure the nuts are evenly roasted. Even with manual labor, on occasion, the sugar syrup can caramelize too quickly in certain areas to produce nut disflavor. Moreover, the product produced by hand stirring may, on occasion be of inconsistent coloration or taste. Thus, it is desirable in such cooking process to mix the nuts continuously to provide for uniform heating of the nuts and evaporation of the liquid from the syrup.

SUMMARY OF THE INVENTION

In accordance with one aspect of the present invention a processing apparatus for comestibles such as nuts is provided and comprises a kettle having an opening at one end thereof for access for insertion and removal of the nuts. The kettle has a generally concave shape and is rotatable about an axis with respect to a supporting base. The kettle has a concave surface generally symmetric with respect to the rotation axis. The kettle, which is preferably made of copper, is heated by one or more gas burners.

A device for mixing the nuts is provided and is secured to the base so it is stationary with respect to the rotating kettle. The mixing device comprises an elongate substantially rigid bar having a concave shape. The bar is spaced from the rotating concave surface of the kettle and contacts the nuts during rotation of the kettle and continuously turns the nuts to provide uniform heating. The mixing device can also be used for enrobing comestibles such as nuts with coatings such as chocolate.

In accordance with one aspect of the invention, the mixing bar comprises a length of flat bar wherein the flat bar has a rectangular cross section having a width greater than its height. The flat bar is bent and has an upper concave surface and a lower convex surface. The mixing device further includes two half-round bars each having a generally semicircular cross section. One of the half-round bars has a concave surface in face-to-face relation with the convex surface of the flat bar. The other half-round bar has a convex surface in face-to-face relation with the concave surface of the flat bar. The half-round bars and the flat bar are secured to one another preferably by a weld.

In accordance with one aspect of the invention, the half-round bars have a width larger than the width of the flat bar to provide two channels along the length of the mixing device. The half-round bars are secured to the flat bar by a weld in each of the channels. The weld substantially fills the channel to provide a smooth exterior.

The mixing bar in accordance with the invention facilitates easy cleaning in that it can be removed from inside the kettle. Once the mixing bar is removed, both the bar and kettle may be easily cleaned. Use of a mixing bar in accordance with the invention is preferable to having ridges or paddles formed on the interior of the kettle because such kettle would be very difficult to clean.

In a mixing process, it is not uncommon to mix 25 to 75 pounds of nuts in the kettle. The stainless steel flat bar provides substantial rigidity so that the mixing device does not bend as it is impacted by the nuts. The two half-round bars provide further rigidity and also provide a rounded surface which permits the nuts to flow over and around the mixing device.

In accordance with a preferred aspect of the invention, the mixing bar has a concave surface which is spaced a predetermined distance away from the concave surface of the cooking kettle and the predetermined distance is substantially equal along the length of the bar. This permits a defined quantity of nuts to pass immediately adjacent the inner surface of the kettle. As the nuts move past the bar, the viscous nature of the nuts and syrup permit the mass of nuts and syrup to turn over as the surface of the kettle passes the stationary bar. In this way, the nuts are uniformly subjected to the heat of the kettle. Additional advantages of a mixing device in accordance with the present invention will be apparent from the detailed description of the invention with reference to the drawings, which follows.

DETAILED DESCRIPTION OF THE INVENTION

Figure 1:
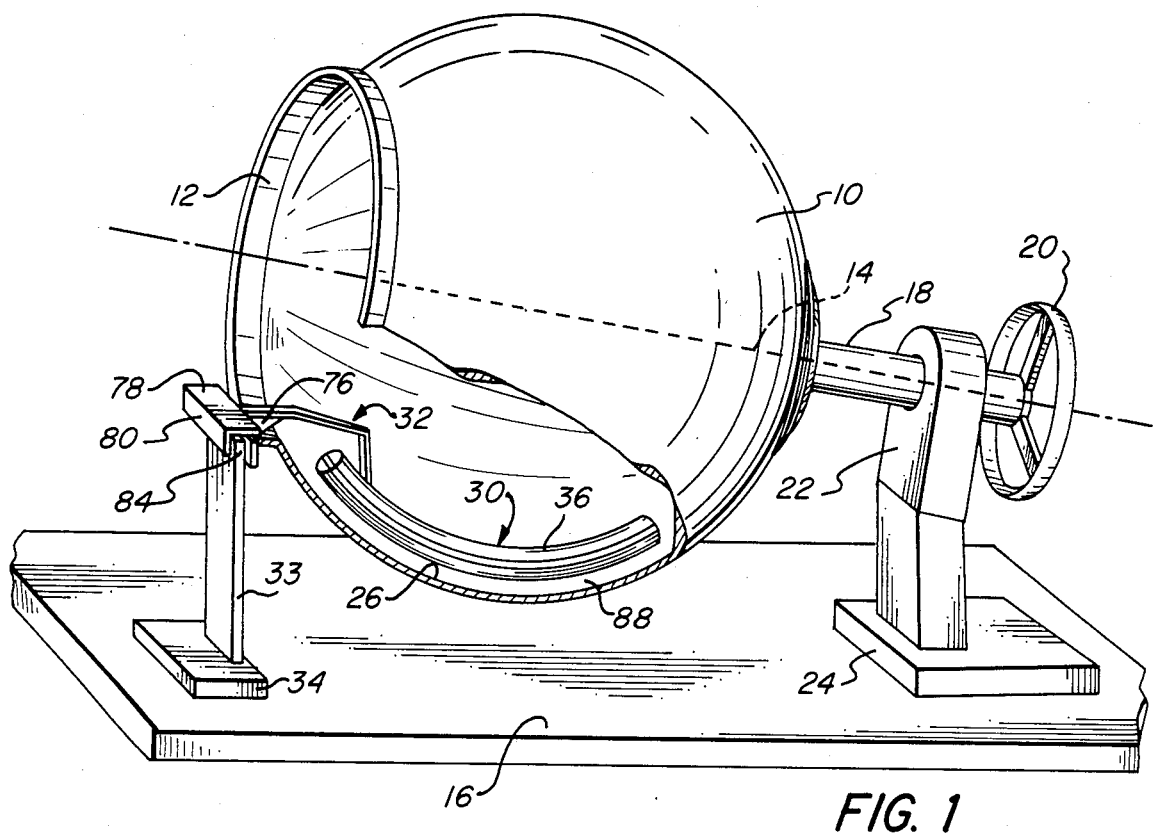
FIG. 1 is a schematic perspective view of a processing apparatus with a portion of the kettle broken away to show the mixing device.
Figure 3:
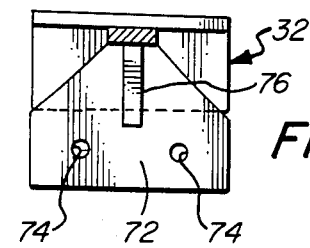
FIG. 3 is a sectional view of the bracket for the mixing device along the plane 3—3 of FIG. 2.
Figure 2:
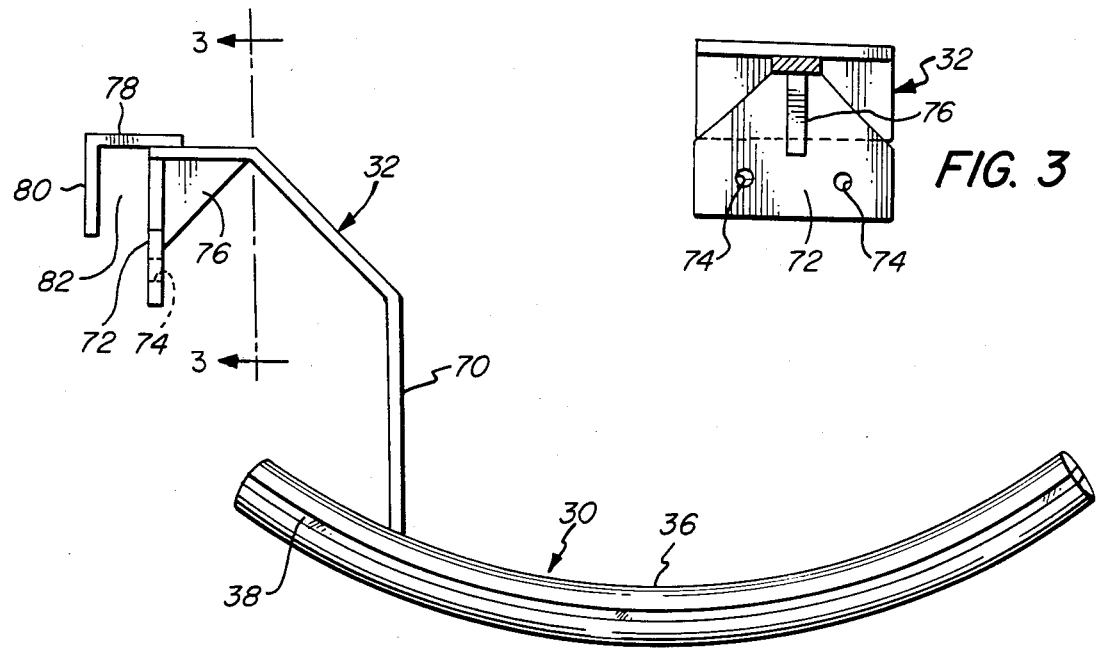
FIG. 2 is a side view of the mixing device.
Figure 4:
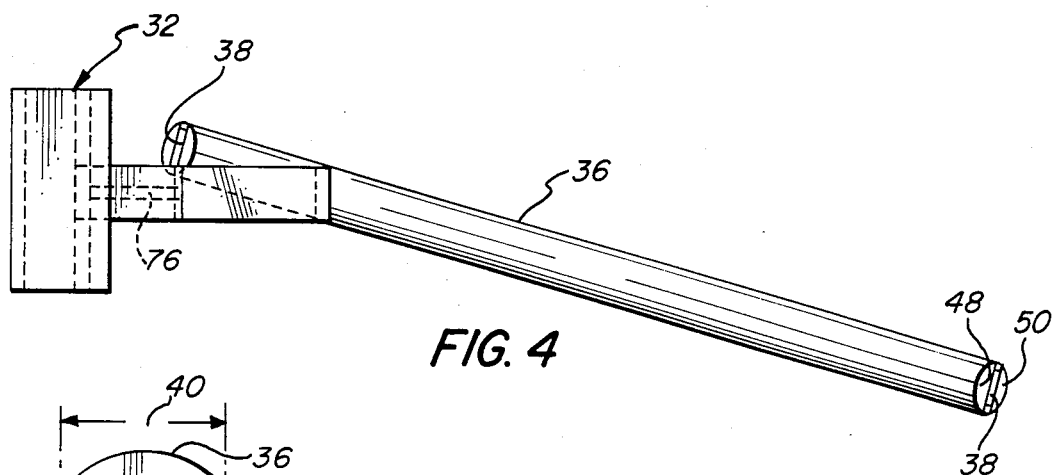
FIG. 4 is a top view of the mixing device.

Referring to FIG. 1 a processing cooking apparatus is shown and comprises a kettle 10 having an opening 12 at one end for access for insertion and removal of comestibles. Kettle 10 has a generally concave shape and is rotatable about an axis 14 with respect to a supporting base 16. Various mechanisms for rotatably supporting the kettle can be utilized. As shown in FIG. 1, the kettle is mounted on a rotatable stem 18 connected to a pulley 20 which is in turn driven by a belt or other suitable source of power. The stem 18 is rotatably journaled in a vertical support 22 which is mounted on base 16 by a pedestal 24.

The kettle 10 has a concave surface 26 which is generally symmetric with respect to the rotation axis 14.

Comestile such as nuts are heated in the kettle 10 which is preferably made from copper. A source of heating the kettle is provided such as a gas burner, not shown in the drawings. In a conventional batch process for nuts coated with a syrup comprising sugar, a quantity such as 25 to about 75 pounds of nuts and syrup are placed in the kettle 10, and the kettle rotates to permit heating of the nuts and syrup. In the conventional operation, a paddle is used to stir the nuts.

In accordance with the present invention, a mixing device 30 is provided. The mixing device 30 is stationary with respect to the rotating kettle 10. More particularly, the mixing device is mounted on a bracket 32 which extends through the opening 12 of the kettle 10. The bracket is supported with respect to base 16 by a vertical support 33 and a pedestal 34.

Figure 6:
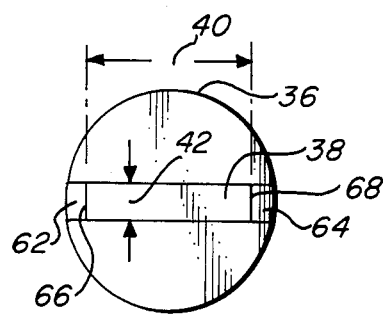
FIG. 6 is an exploded perspective view of the bar of the mixing device.

Referring in particular to FIGS. 2-5, the mixing device will be described in greater detail. The mixing device 30 comprises an elongate substantially rigid bar 36. Bar 36 comprises a length of flat bar 38 having a rectangular cross section with a width 40 greater than its height 42 (See FIG. 6). As shown best in FIG. 5 the flat bar has an upper concave surface 44 and a lower convex surface 46. The mixing bar 36 further comprises two half-round bars 48 and 50 each having a generally semicircular cross section 52 and 54. The bars 48 and 50 are preferably precisely semicircular in cross section. However, it should be understood that other cross sectional shapes can be utilized provided they have a flat surface that can lie in face-to-face relation with the surfaces 44 and 46 of the flat bar 38. Half-round bar 50 has a concave surface 56 position in face-to-face relation with convex surface 46 of flat bar 38. Similarly, half-round bar 48 has a convex surface 58 in face-to-face relation with the concave surface 44 of flat bar 38.

Figure 5:
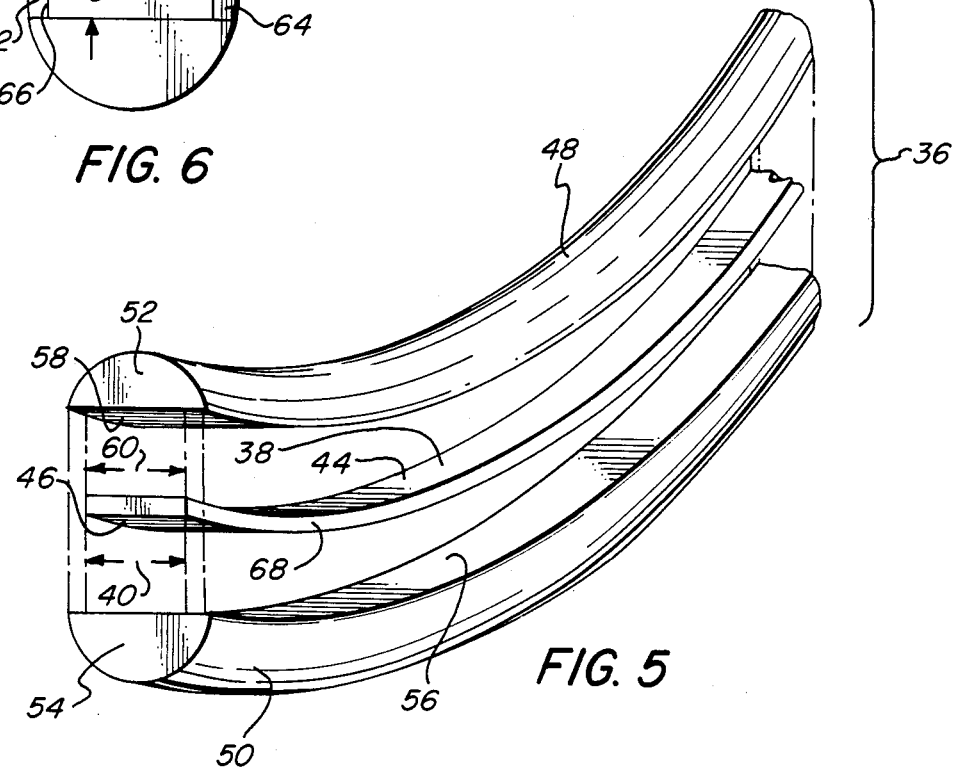
FIG. 5 is an end view of the mixing device.

The manner in which the flat bar 38 and the half-rounds bars 48 and 50 are secured together will now be described. As best shown in FIG. 5, the half-round bars each have width 60 which is greater than the width 40 of the flat bar 38. The half-round bars 48 and 50 are positioned so that their surfaces are in face-to-face relation with the flat bar to provide a pair of channels 62 and 64 along the length of mixing bar 36. Each channel 62 and 64 is bounded by an edge 66 and 68 of the flat bar 38 and by surfaces 56 and 58 of the half-round bars. In order to secure the flat bar 38 and the half-round bars 48 and 50 together, a weld substantially filling the channels 62 and 64 is placed along substantially the entire length of each channel. The weld in each channel substantially fills the channel to provide a bar 36 having a rounded exterior. After the welding operation if there are burrs or the weld is uneven, the edge of the bar 36 can be smoothed with a grinding wheel.

As shown in FIGS. 1 through 4, a bracket 32 secures the bar 36 in a stationary position with respect to rotating kettle 12. The bracket includes an elongate arm 70 that is bent downwardly to provide for proper location of the bar 36 in the bottom most location of the kettle 12. The elongate arm is welded to a support bracket 72 having a pair of bolt holes 74 which permit securement to vertical support 33 as shown in FIG. 1. A strengthening web 76 provides rigidity to arm 70. The bracket 32 also includes an L-shaped bracket 78 having one arm 80 spaced a predetermined distance from plate 72 to provide a gap 82 in which the upper end 84 of vertical support 33 is positioned.

As shown particularly well FIG. 1, the concave surface 26 of the cooking kettle is spaced apart a predetermined distance 88 from the bar 36. Preferably, the spacing distance 88 is substantially equal along the length of the bar and such distance comprises between about 3 and about 6 inches. The spacing is selected so that some of the nuts being processed in the kettle can pass beneath the bar 36. In this way, crushing of the nutmeat is reduced or substantially avoided. As the kettle 12 turns, the nuts pass over bar 36 and are turned in a fluid motion thus providing even surface contact between the nuts and the interior surface of kettle 12. By such uniform mixing of the nuts, the kettle heats the nuts uniformly providing a consistent product, that is, a product whose coloration and degree of roasting is within desired product quality levels.

The kettle has a capacity between about 25 and about 50 pounds of nuts, syrup and other foods. As the kettle is turned, a substantial force is placed upon the mixing bar 36. By using a flat bar positioned with its width 40 parallel to the flow of the product, the bar 36 has substantial resistance to bending. Preferably, flat bar 38 and half-round bars 48 and 50 are made from stainless steel, and preferably 304 stainless. As mentioned previously, the contour of the bar 36 should conform to the contour of the cooking kettle. By producing a bar 36 having several components, it is possible to bend the flat bar, and the half-round bars 48 and 50 in the precise shape desired. Such a bending would be extremely difficult, if at all possible, with a solid stainless steel round bar.

It has been determined that use of the bar 36 in mixing of kettle contents reduces the amount of manual labor previously required to fully mix the contents by between about 90 to about 95 percent. Although the kettle shown in FIG. 1 has a single bar, if desired, two or more bars can be installed in an single kettle. The length of the bar 36 should be any length suitable to fit within the kettle. Bar 36 is preferably between about 20 to 25 inches long. It is preferable that the flat bar have a similar length and be approximately three quarters of an inch by one quarter of an inch. Half-round bar preferably has a one inch diameter to provide channels having a depth of approximately one eight of an inch.

The mixing device is not only useful in cooking applications but also is useful in processing applications where it is desirable to coat or enrobe comestibles, such as coating nuts with chocolate.

It should be understood that although specific embodiments of the invention have been described herein in detail, such description is for purposes of illustration only and modifications may be made thereto by those skilled in the art within the scope of the invention.

We claim:

1. A processing apparatus for comestibles comprising:

a kettle having an opening at one end thereof for access for insertion and removal of said comestibles, said kettle having a generally concave shape and being rotatable about an axis with respect to a supporting base, said kettle having a concave surface generally symmetric with respect to said rotation axis;

means for rotating said kettle about said axis;

a device for mixing said comestibles, said device being stationary with respect to said rotating kettle and comprising an elongate substantially rigid bar, said bar having a concave shape and spaced from said rotating concave surface of said kettle, said bar contacting said comestibles during rotation of said kettle and continuously turning said comestibles to provide substantially uniform heating of said comestibles.

2. An apparatus according to claim 1 wherein said bar has a rounded exterior surface to permit said comestibles to flow substantially freely adjacent said bar.

3. An apparatus according to claim 1 wherein said concave shape of said bar is substantially coincident with a plane.

4. An apparatus according to claim 3 wherein said bar comprises a length of flat bar, said flat bar having a rectangular cross section having a width greater than its height, said flat bar having an upper concave surface and a lower convex surface, said bar further comprising two half-round bars each having a generally semicircular cross section, one said half-round bar having a concave surface in face-to-face relation with said convex surface of said flat bar, another said half-round bar having a convex surface in face-to-face relation with said concave surface of said flat bar, said bar further including means for securing said flat bar and said half-round bars together.

5. An apparatus according to claim 4 wherein said half-round bars having a width larger than said flat bar width, said half-round bars being positioned in face-to-face relation with said flat bar to provide a pair of channels along the length of said mixing bar, each said channel being bounded by an edge of said flat bar and said surfaces of said half-round bars, said securing means comprising a weld in each said channel, said weld substantially filling said channels to provide a rounded exterior on said bar.

6. An apparatus according to claim 5 wherein said mixing bar and said concave surface of said cooking kettle are spaced apart a predetermined distance and wherein said predetermined spacing distance is substantially equal along the length of said bar.

7. An apparatus according to claim 6 wherein said bar has two end portions, one said end portion being connected to a clamp, said clamp extending through said kettle opening and being secured to said supporting base.

8. An apparatus according to claim 7 wherein said flat bar comprises stainless steel.

9. An apparatus according to claim 8 wherein said welds in said channels are substantially flush with the exterior surface of said mixing bar.

10. An apparatus according to claim 9 wherein said distance comprises between about three and about six inches.

11. An apparatus according to claim 1 wherein said kettle comprises copper and wherein said kettle is heated to cook said comestibles.

12. A device for mixing comestibles in a kettle having an opening at one end thereof for access for insertion and removal of said comestibles, said kettle having a generally concave shape and being rotatable about an axis with respect to a supporting base, said kettle having a concave surface generally symmetric with respect to said rotation axis, said device comprising:

an elongate substantially rigid bar, said bar having a concave shape, means for spacing said bar from said rotating concave surface of said kettle, said bar comprising a length of flat bar, said flat bar having a rectangular cross section having a width greater than its height, said flat bar having an upper concave surface and a lower convex surface, said bar further comprising two half-round bars each having a generally semicircular cross section, one said half-round bar having a concave surface in face-to-face relation with said convex surface of said flat bar, another said half-round bar having a convex surface in face-to-face relation with said concave surface of said flat bar, said bar further including means for securing said flat bar and said half-round bars together, said bar contacting said comestibles during rotation of said kettle and continuously turning said comestibles to provide substantially uniform heating of said comestibles.

13. A device according to claim 12 wherein said bar has a rounded exterior surface to permit said comestibles to flow substantially freely adjacent said bar.

14. A device according to claim 13 wherein said concave shape of said bar is substantially coincident with a plane.

15. A device according to claim 12 wherein said half-round bars having a width larger than said flat bar width, said half-round bars being positioned in face-to-face relation with said flat bar to provide a pair of channels along the length of said mixing bar, each said channel being bounded by an edge of said flat bar and said surfaces of said half-round bars, said securing means comprising a weld in each said channel, said weld substantially filling said channels to provide a rounded exterior on said bar.

16. A device according to claim 15 wherein said mixing bar and said concave surface of said cooking kettle are spaced apart a predetermined distance and wherein said predetermined spacing distance is substantially equal along the length of said bar.

17. A device according to claim 12 wherein said bar has two end portions, one said end portion being connected to a clamp, said clamp extending through said kettle opening and being secured to said supporting base.

18. A device according to claim 17 wherein said flat bar comprises stainless steel.

19. A device according to claim 18 wherein said welds in said channels are substantially flush with the exterior surface of said mixing bar.

* * * * *